United States Patent

[11] 3,601,215

| [72] | Inventor | Roland N. Nissen |
| | | P.O. Box 183, Cawker City, Kans. 67430 |
| [21] | Appl. No. | 813,980 |
| [22] | Filed | Apr. 7, 1969 |
| [45] | Patented | Aug. 24, 1971 |

[54] AIR-CUSHION VEHICLE
3 Claims, 7 Drawing Figs.

[52] U.S. Cl. ............................................. 180/120,
180/27, 180/77 R, 180/119
[51] Int. Cl. ............................................. B60v 1/14
[50] Field of Search ...................................... 180/120,
119, 117, 129, 121, 130

[56] References Cited
UNITED STATES PATENTS
| 3,039,550 | 6/1962 | Beardsley | 180/129 |
| 3,162,260 | 12/1964 | Cockerell | 180/129 X |
| 3,227,234 | 1/1966 | Simon | 180/119 |
| 3,291,236 | 12/1966 | Foshag et al. | 180/129 X |
| 3,302,602 | 2/1967 | Korganoff | 180/120 X |
| 3,412,956 | 11/1968 | Cockerell | 180/121 X |

FOREIGN PATENTS
| 251,509 | 8/1963 | Australia | 180/130 |

Primary Examiner—A. Harry Levy
Attorney—Jonh H. Widdowson

ABSTRACT: This invention is an air-cushion vehicle adapted to be used over the water as well as land having propulsion through a pair of blower members and operable through baffle structures to divide the output air flow between the functions of lift and propulsion. More particularly, this invention is an air-cushion vehicle having gyroscopic control means utilizing the power means to provide torque characteristics for turning the same and having additional means for propelling and directing the vehicle while in direct contact with land surfaces.

INVENTOR.
ROLAND N. NISSEN
BY
John H. Widdowson
ATTORNEY

INVENTOR.
ROLAND N. NISSEN
BY
John H. Widdowson
ATTORNEY

INVENTOR.
ROLAND N. NISSEN
BY John H. Widdowson
ATTORNEY

AIR-CUSHION VEHICLE

The use of an air-cushion principal for lifting a vehicle is known to the prior art whereupon an air pressure chamber is open to the ground surface whereby the increased pressure inside of the chamber lifts the vehicle slightly above the same. After the vehicle is raised above the ground surface, it is obvious that only a small propulsion force is required to move the vehicle over the ground surface due to the low frictional support. However, the prior art devices are generally complicated in structure and do not have economical efficient means of readily controlling the same during lift, turning, and propulsion. Also, the prior art devices are not provided with the readily movable power means and blower means whereupon the movement of the same operates gyroscopically to aid in the turning of the vehicle plus automatically redistributing the propulsion air output between lift and propulsion features.

In one preferred embodiment of this invention, an air-cushion vehicle is provided shaped similar to a boat structure adapted to be operable over both land and water surfaces including a main support means; a power means to provide the required air propulsion force; and a control means operably connected to the power means to provide the required directional forces for turning, lift, and propulsion. The support means includes a main body means having flotation material mounted thereon; a main cockpit area for receiving an operator therein and shaped so as to provide an additional flotation factor; propulsion duct means extended through the body means having rearwardly extended openings for propulsion purposes; and lift duct means mounted within the body means operably connected to the propulsion duct means and providing a downward propulsion air therefrom for lift functions. The power means includes a main motor means mounted on the body means through a gyromount assembly; blower means having a pair of parallel opposed axial flow blower assemblies driven by the motor means operable to supply pressure air flow outwardly through the propulsion duct means and the lift duct means; and an auxiliary land power assembly having ground contacting wheel members for movement over land surfaces when in contact therewith. The control means includes a ground contact control assembly; an airborne gyrocontrol assembly; a baffle control assembly; and a throttle control assembly. The ground contact control assembly includes a main steering wheel interconnected through pulley and cable type systems to a rearwardly mounted wheel member operable to guide the vehicle when in contact with the ground surface and under propulsion of the auxiliary land power assembly. The airborne gyrocontrol assembly includes the motor means mounted through the motor mount assembly so as to be pivotal about a horizontal axis whereupon the rotating flywheel of the motor means provides a gyro for turning the air-cushion vehicle. The steering wheel is operable to pivotally move the support means about the mount assembly to provide the required torque for turning forces. The baffle control assembly is connected to the steering wheel through the pulley members to pivot respective baffle members which are mounted between the propulsion duct means and the lift duct means to divert the air flow from the blower structures therebetween. The throttle control assembly is provided with a throttle member operably connected to the baffle members through a linkage structure so as to override the baffle control assembly whereupon the baffle members are moved conjointly in either upward or downward directions to direct the majority of air flow either through the propulsion duct means for increased speed or through the lift duct means for decreased speed and resultant increased lift.

One object of this invention is to provide an air-cushion vehicle overcoming the aforementioned disadvantages of the prior art structures.

A further object of this invention is to provide an air-cushion vehicle operable to travel over both water and land surfaces having a power means connected to a blower means whereupon the power means is pivotally mounted so as to achieve a gyroscopic effect in controlling balance and turning movements.

A still further object of this invention is to provide an air-cushion vehicle having control means operable to control the amount and deflection of output air flow through propulsion and lift duct means to control the speed and amount of lift.

Still, another object of this invention is to provide an air-cushion vehicle having an auxiliary land power assembly for providing propulsion when in contact with the support surface and a ground contact control assembly operable to provide the required guidance control.

One further object of this invention is to provide an air-cushion vehicle which is compact in structure having a power means to operate blower structures and act as a gyroscopic control member plus provided with control means operable to divert the output air flow between propulsion and lift functions.

Still, another object of this invention is to provide air-cushion vehicle which is readily operable when in contact with a land surface; operable as an air-cushion vehicle over land and water surfaces; and having novel control means for maneuvering the vehicle.

Still, one further object of this invention is to provide an air-cushion vehicle which is compact in size; relatively economical to manufacture; provides a maximum in power output relative to weight; and one that is quickly responsive to pilot control adjustments. Various other objects, advantages, and features of the invention will become apparent to those skilled in the in from the following discussion, taken in conjunction with the accompanying drawings, in which.

Figure 1:
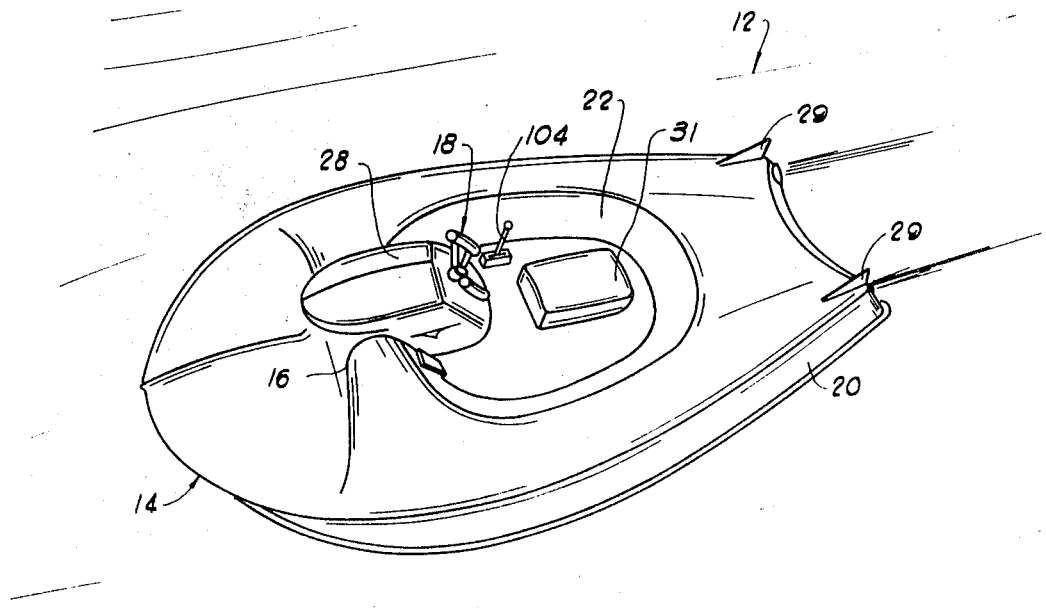
FIG. 1 is a perspective view of an air-cushion vehicle of this invention.

The following is a discussion and description of preferred specific embodiments of the new air-cushion vehicle of this invention, such being made with reference to the drawings, whereupon the same reference numerals are used to indicate the same or similar parts and/or structure. It is to be understood that this discussion and description is not to unduly limit the scope of the invention. Referring to the drawings in detail and in particular to FIG. 1, an air-cushion vehicle of this invention, indicated generally at 12, is readily movable while supported by an air cushion over land or water and provided with means for propelling the same while in contact with a supporting surface. The air-cushion vehicle 12 includes a main operator support means 14; a power means 16 mounted within the support means 14 to provide the necessary power for travel under air flow or contact with a land surface; and control means 18 connected to the power means 16.

The support means 14 includes a boat type body means 20 having flotation material (not shown) molded therewithin; a cockpit area 22 shaped to add to the flotation and to receive the operator therein; propulsion duct means 24 molded within the body means 20 to direct air flow rearwardly of the body means 20; and lift duct means 26 molded within the body means 20 to direct a portion of the air flow downwardly to provide the necessary lift function that will be explained. The body means 20 is of streamlined shape having a main control panel 28 accessible to one in the cockpit area 22 and upright fin members 29 at the rearward area to add stability. It is seen that the cockpit area 22 plus the flotation material buoyancy of the entire vehicle 12 in case the same loses power while over a water area. Additionally, a floatable cushion or seat member 31 is provided to receive the operator thereon.

The propulsion duct means 24 includes tube members 32 and 34, each of a contoured shape extended outwardly from the control panel 28 and curved rearwardly to discharge through respective upright openings 36. The propulsion duct means 24 is of a substantially egg shape in transverse cross section operable to discharge air flow in a generally horizontal direction providing for the increase and decrease of forward speed of the air-cushion vehicle 12. The lift duct means 26 includes conduit members 38 and 39, each provided with a first entrance area 41 and a downward, enlarged discharge area 43. Adjacent the discharge areas 43 are provided a plurality of arcuate fin members 45 to direct the discharge air flow from the power means 16 downwardly in a plurality of separate channels so as to assure stability of the vehicle 12 regardless of the obstacles over which the same may be passing. It is noted that the propulsion duct means 24 and the lift duct means 26 are joined at a common point indicated at 46 whereupon the air flow directed above and below such point determines the amount of lift and/or propulsion to be achieved as will become obvious.

Figure 4:
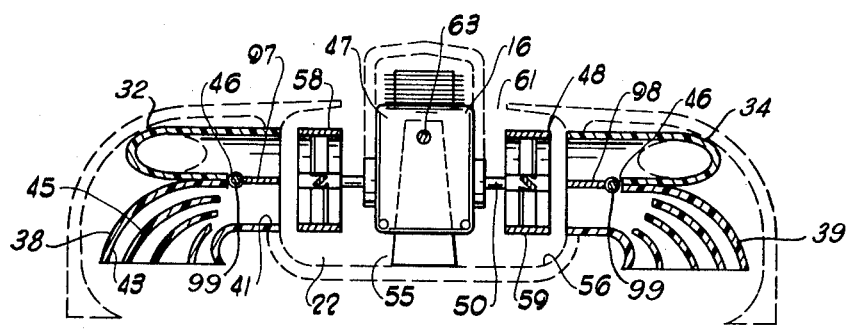
FIG. 4 is an enlarged sectional view taken along line 4—4 in FIG. 5.
Figure 5:
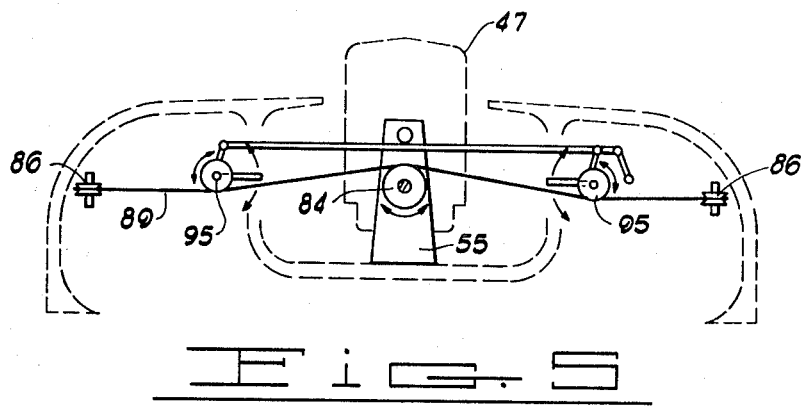
FIG. 5 is a view similar to FIG. 4 illustrating a control assembly of the air-cushion vehicle of this invention.

As shown in FIG. 4, the power means 16 includes a main motor means 47; blower means 48 operably connected to the motor means 47 through shaft members 50 for the rotation thereof; and an auxiliary land power assembly 52. The motor means 47 is preferrably of an internal combustion type operable to drive the shaft members 50 and having a rotating flywheel member 53 thereon. The motor means 47 is mounted through a gyromount assembly 55 to a bottom wall 56 of the cockpit area 22. The blower means 48 includes two blower members 58 and 59, each of a cage-type adapted to receive inlet air about the control panel 28 indicated at 61 for axial discharge directly outwardly in the direction of the shaft members 50 towards the propulsion duct means 24 and the lift duct means 26. It is seen that the motor means 47 and the interconnected blower members 58 and 59 are connected as a unit to a pivot shaft 63, being a part of the gyromount assembly 55. It is obvious that the rotating flywheel member 53 of the motor means 47 acts under gyroscopic principals to provide the stabilization position needed for moving the body means 20 thereabout.

Figure 2:
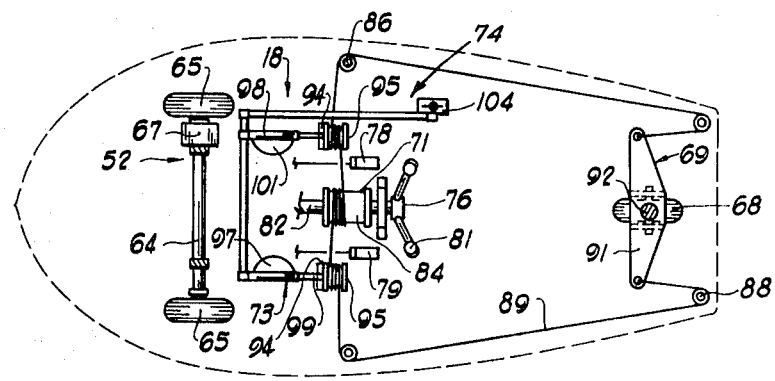
FIG. 2 shows an auxiliary land power assembly and ground contact control assembly with the outline of the air-cushion vehicle of this invention illustrated in dotted lines.
Figure 3:
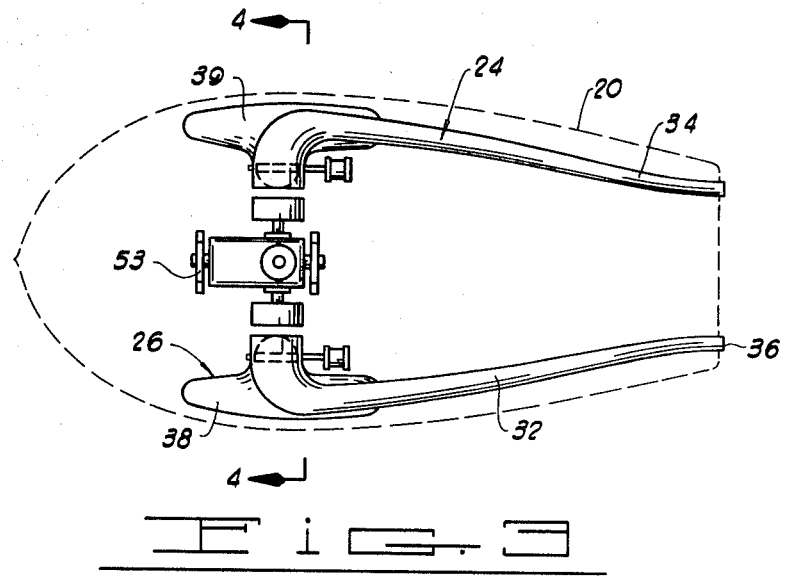
FIG. 3 is a top plan view illustrating the duct means of the air-cushion vehicle of this invention.

The auxiliary land power assembly 52 as indicated in FIG. 2, includes a front wheel axle member 64 having opposed wheel members 65 thereon; a motor member 67 to drive the wheel members 65; and a third guide wheel member 68 mounted at a rearward portion of the body means 20. It is obvious that the wheel members 65 and 68 extend below the outer edges of the body means 20 so as to be engageable with a land surface when the same is being propulsed by the motor member 67. The auxiliary land power assembly 52 may include the motor member 67 or a power takeoff system may be used from the motor means 47 to achieve the required rotational power outwardly through a transmission means (not shown) to provide the necessary power while engaging a land surface.

The control means 18 includes a ground contact control assembly 69; an airborne gyrocontrol assembly 71; a baffle control assembly 73; and a throttle control assembly 74. The ground contact control assembly 69 includes a steering assembly 76 connected to the guide wheel member 68; an accelerator assembly 78 operably connected to the power means 16; and a brake assembly 79 connected to the front wheel members 65.

The steering assembly 76 includes a main steering wheel 81 connected to a guide shaft 82 having an actuator drum 84 connected thereto. In turn, the actuator drum 84 is connected through forward and rearward pulley members 86 and 88, respectively, by a cable member 89 trained thereabout. The rearward ends of the cable member 89 are interconnected to an actuator arm 91 secured to the upper end of a shaft 92 connected to the guide wheel member 68. It is seen that the steering wheel 81 on rotation operates to concurrently wind and unwind the cable member 89 about the actuator drum 84 so as to turn the actuator arm 91 in the desired direction for steering the air-cushion vehicle 12 when in contact with a support surface. The accelerator assembly 78 is attached in a conventional manner to the power means 16 to increase and decrease the power requirements to drive the front wheel members 65. Also, it is obvious that the brake assembly 79 can be readily connected to the front wheel members 65 for controlling movement through a cable and linkage system (not shown) in a conventional manner.

The airborne gyrocontrol assembly 71 includes clutch members 94 attached to respective ones of cable drum members 95 which, in turn, are connected to the baffle control assembly 73. More particularly, the baffle control assembly 73 includes baffle members 97 and 98, each pivotally mounted upon shaft members 99 and positioned adjacent the junction of the propulsion duct means 24 and lift duct means 26. It is seen that each baffle member 98, includes a laterally extended body section 101 mounted upon the respective shaft members 99 so as to be movable upwardly to restrict air flow into the propulsion duct means 24 and downwardly to control air flow into the lift duct means 26 for reasons to become obvious. The baffle members 97 and 98 are moved in opposite directions with rotation of the steering wheel 81 when so connected through the clutch members 94 as will be described.

The throttle control assembly 74 includes a control lever member 104 in the cockpit area 22 mounted through a linkage assembly to the baffle members 97 and 98. The throttle control assembly 74 is operable by a conventional electrical switch means to disengage the baffle control assembly 73 through the clutch members 94 which may be of a conventional electrically operated type so as to provide an independent control for moving the baffle members 97 and 98 in the same direction, namely, upwardly or downwardly, so as to divert additional air flow to the propulsion duct means 24 or to the lift duct means 26 as required. The throttle control assembly 74 is normally used when desiring to increase or decrease speed to move the baffled members 97 and 98 concurrently either up or down, respectively whereas the baffle control assembly 73 is operable to move the baffle members 97 and 98 on rotation of the steering wheel 81 in opposite directions so as to unbalance air flow to the duct means 24 and 26 for turning purposes as will be explained.

In the use and operation of the air-cushion vehicle 12 of this invention, it is obvious that the cockpit area 22 having the cushion member 31 therein is adapted to receive an operator therewithin. It is seen that the auxiliary land power assembly 52 is operable through the brake assembly 79, the accelerator assembly 78, and the steering wheel 81 for moving the same over land surface substantially similar to a three-wheeled motorcycle structure. It is obvious that the cable member 89 is operable on rotation of the steering wheel 81 to move the actuator arm 91 and the guide wheel member 68 for moving the vehicle 12 over the supporting surface.

On utilizing the air-cushion vehicle 12 over a land surface, it is obvious that the motor means 47 can be controlled through the lever member 104 to increase the power to be achieved which, in turn, increases rotation of the attached blower members 58 and 59. The motor means 47 may normally be generated at maximum capacity whereupon the diversion of the air flow between lift and propulsion functions controls the speed and lift as will become obvious. Therefore, as shown in FIG. 4, it is seen that the air flow is directed axially in a generally horizontal plane so as to be movable through the propulsion duct means 24 and the lift duct means 26. It is obvious that the throttle control assembly 74 may be operable to concurrently move the baffle members 97 and 98 upwardly so as to divert a greater portion of the propulsion air through the lift duct means 26. On reaching a desired height, it is obvious that the amount of air diverted through the propulsion duct means 24 operates to provide forward movement of the vehicle 12. It is also obvious that on achieving the lift condition, only a small amount of air flow through the propulsion duct means 24 is necessary to move the vehicle 12 as the same is on a cushion of air. Thereupon, it is obvious that the throttle control assembly 74 is operable to concurrently move the baffle members 97 and 98 downwardly to direct a greater portion of the air flow upwardly to the propulsion duct means 24 to achieve the desired forward speed.

Figure 6:
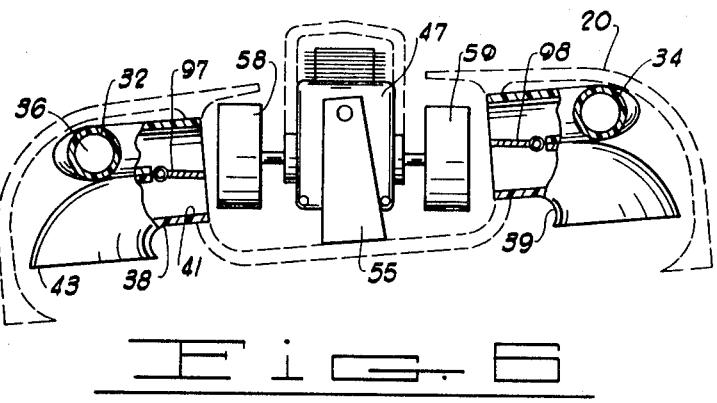
FIGS. 6 and 7 are similar to FIG. 4 illustrating the turning operation of the air-cushion vehicle of this invention.
Figure 7:
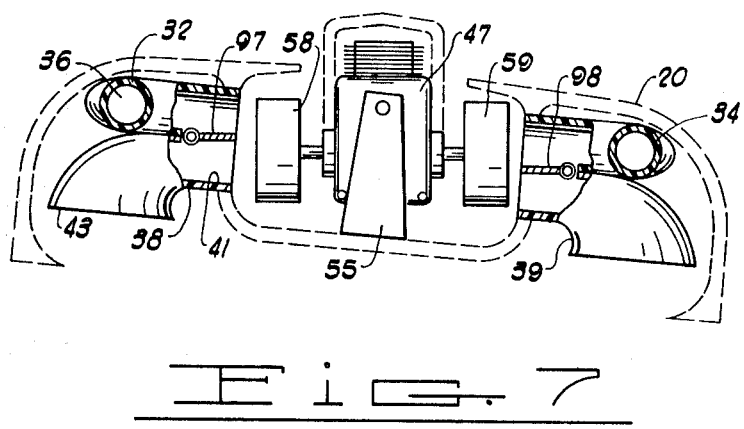

It is seen that the weight of the flywheel member 53 of the motor means 47 plus the weight of the blower members 58 and 59 will constitute the gyrocentrifugal force in the vertical plane. On turning the vehicle, it is obvious that movement of the steering wheel member 81 acts to move the vehicle 12 about the gyroforce of the blower means 48 and motor means 47 which concurrently diverts a disproportionate amount of air flow on respective opposite sides between the propulsion duct means 25 and the lift duct means 26. More particularly, as shown in FIG. 6, in this condition a greater amount of air flow from the blower member 59 will be directed through the right-hand side of the lift duct means 26 whereas a lesser air flow will be concurrently directed to the conduit member 38 on the opposite side thereby achieving a turn in the left hand direction as viewed in FIG. 6. Concurrently, it is seen the opposite effect will be made while turning the vehicle 12 to the right as viewed in FIG. 7. Additionally, it is obvious that in the conditions of FIGS. 6 and 7, this disproportionate share of air flow acts through the propulsion duct means 24 so as to aid in turning about the vertical axis.

It is obvious that the same operation through the control means 18 of the air-cushion vehicle 12 of this invention would provide the identical lift and propulsion air flow plus the air flow diversion for turning when over a water surface as described above for operation over a land surface. It is seen that the cockpit area 22 is provided with sealed means to provide for flotation as the motor means 47 and blower means 48 are provided in a forward compartment underneath the control panel 28.

It is seen that the air-cushion vehicle of this invention provides a neat appearing, compact structure which is light weight but having maximum power versus weight characteristics to achieve the needed lift and propulsion and can carry a single operator or can be build as a large passenger conveyance vehicle. Also, the air-cushion vehicle of this invention provides a new and novel control means operable to readily and easily utilize the power means and blower means as a gyroscope for controlling movement. The opposed blower members are automatically operable on turning movement to divert air flow between the propulsion duct means and the lift duct means to achieve the required turning function in a most efficient and effective manner. Also, the air-cushion vehicle of this invention is readily operable over land and water surfaces and, additionally, has means for propulsion and guidance when in contact with a land surface on wheel members. It is seen that the air-cushion vehicle of this invention is relatively economical to manufacture; provides the utmost desirability in weight to power ratio; is safe in operation; provides efficient and effective guidance and control means; and is basically simple to operate.

While the invention has been described in conjunction with preferred specific embodiments thereof, it is to be understood that this description is intended to illustrate the invention, which is defined by the following claims.

I claim:

1. An air-cushion vehicle adapted for travel over land and water surfaces, comprising:
   a. support means including a main body means having duct means therewithin on both sides of said body means to direct air flow in downwardly and rearwardly directions,
   b. power means mounted on said body means including a motor means operably connected to a blower means to provide air flow into said duct means,
   c. control means connected to said body means and said power means operable under one set of conditions to vary the amount of air flow between said downwardly direction and said rearwardly direction from said duct means to increase and decrease the forward speed of said vehicle and operable under a second set of conditions to direct a disproportionate share between said downwardly direction and said rearwardly direction of the air flow from said duct means on each respective side of said body means to provide unbalanced forces on opposite sides for turning purposes,
   d. said duct means having on each side of said body means a propulsion duct means to receive air from said blower means and direct the same rearwardly in a substantial horizontal plane for propulsion purposes and a lift duct means operably connected to said blower means to direct air flow downwardly to provide an air cushion for said vehicle,
   e. said control means including a baffle control assembly having a baffle member mounted between respective junctions of said propulsion duct means and said lift duct means operable on movement thereof to direct and control the amount of air flow from said blower means between said propulsion duct means and said lift duct means,
   f. said blower means having a pair of blower members connected through drive shafts to opposite sides of said motor means, said blower members to discharge air generally perpendicular to direction of travel of said vehicle into said duct means, and
   g. said motor means pivotally connected to a motor mount assembly secured to said body means, said motor means and said blower means acts as a gyroscope providing a stabilization factor for moving said body means thereabout.

2. An air-cushion vehicle as described in claim 1, wherein:
   a. said control means including a ground contact control assembly having a plurality of wheel members engageable with the land surface for movement thereover; a power motor connected to said wheel members for propulsion of the same; and a steering member operably connected to one of said wheel members for turning the same for the directional control of said vehicle when in contact with the land surface, and
   b. said steering member also connected through clutch members to said baffle control assembly to move said baffle members in opposite directions to turn said vehicle when not in contact with the land surface.

3. An air-cushion vehicle as described in claim 1, wherein:
   a. said baffle control assembly having a pair of baffle members each adjacent a respective inlet area of said duct means and independently movable directing air flow thereto; and a throttle control assembly connected to said baffle members operable to move the same concurrently upwardly or downwardly so as to control the direction of air flow into said duct means thereby controlling the forward speed of said vehicle, and
   b. said throttle control assembly connected through clutch members to said baffle members to move same in opposite directions concurrently for turning of said vehicle when in the airborne condition.